United States Patent [19]

Geyer

[11] Patent Number: 5,366,622
[45] Date of Patent: Nov. 22, 1994

[54] PROCEDURE AND INSTALLATION FOR CONDITIONING AND SUBSEQUENT DEWATERING OF SLUDGE

[75] Inventor: Stephan Geyer, Allendorf, Germany
[73] Assignee: Passavant-Werke AG, Germany
[21] Appl. No.: 762,301
[22] Filed: Sep. 20, 1991
[30] Foreign Application Priority Data
  Sep. 20, 1990 [DE] Germany .............................. 4029825
[51] Int. Cl.$^5$ ............................................. C02F 1/52
[52] U.S. Cl. ..................................... 210/199; 210/752
[58] Field of Search .............. 210/738, 199, 206, 709, 210/198.1, 219, 220, 96.1, 107, 752

[56] References Cited

U.S. PATENT DOCUMENTS

| | | | |
|---|---|---|---|
| 3,666,663 | 5/1972 | Walker | 210/738 |
| 4,206,052 | 6/1980 | Mandt | 210/199 |
| 4,539,120 | 9/1985 | Robinson | 210/738 |
| 4,663,055 | 5/1987 | Long et al. | 210/738 |
| 4,675,116 | 6/1987 | Hoyland | 210/738 |
| 5,093,008 | 3/1992 | Clifford, III | 210/738 |

FOREIGN PATENT DOCUMENTS

| | | |
|---|---|---|
| 0151747 | 8/1985 | European Pat. Off. . |
| 0172649 | 2/1986 | European Pat. Off. . |
| 2353874 | 5/1974 | Germany . |
| 3131411A1 | 6/1982 | Germany . |
| 3247912C2 | 6/1984 | Germany . |
| 3344275A1 | 6/1985 | Germany . |
| 3743428A1 | 7/1988 | Germany . |
| 3743429A1 | 7/1988 | Germany . |
| 15356 | 2/1979 | Japan .................... 210/752 |
| 487082 | 4/1968 | Switzerland . |

*Primary Examiner*—Neil McCarthy
*Attorney, Agent, or Firm*—Larson and Taylor

[57] ABSTRACT

When adding flocculant to a sludge suspension, which will be dewatered, within a pressure pipe between a feed pump and a dewatering equipment, the distance between the dosing point and the inlet of the dewatering equipment will be modified during operation, e.g. by displacing a lance carrying a dosing head within the sludge pipe or by selectively operating a number of dosing points being positioned at different distances to the dewatering equipment. In this way it is possible to adjust most optimally the retention time being available for the formation and consolidation of floc particles with regard to the present operation conditions and the type of added flocculant.

14 Claims, 3 Drawing Sheets

PROCEDURE AND INSTALLATION FOR CONDITIONING AND SUBSEQUENT DEWATERING OF SLUDGE

The invention relates to a procedure for conditioning and subsequent dewatering of sludge as well as to an installation for performing this procedure.

Many different kinds of sludge, particularly sludge originating from waster water treatment or water purification, are hard to dewater in dewatering equipment such as chamber filter presses, belt filter presses and other similar equipment; therefore, a previous conditioning to improve the capability for dewatering is required. Such conditioning is generally achieved by addition of one or several chemicals acting as flocculation agent. The present patent claim refers to flocculants as an agent used to agglomerate colloidal and dissolved matter contained in sludge to form large, dense floc particles as well as a flocculation aid supporting the agglomeration process and consolidation of the floc. The invention is preferably used along with sludge conditioning by adding flocculants in form of organic polymeric compounds, so-called polyelectrolytes.

The capability for dewatering which has been achieved by conditioning depends strongly upon the quantity, size and especially the structure and stability of the formed floc particles. It is a known fact that not only type and amount of the added flocculant but also the mixing energy and the subsequent retention time decisively influence the formation and consolidation of the floc particles.

The journal "Abwassertechnik", Issue 1/1965 (page 4) explains that the quantity of the added flocculant has to be controlled as a function of the flow quantity as well as of the suspended solids content of the sludge delivered by the feed pump. It is known from DE-OS 37 43 428 to measure quantity, size and/or structure of the floc particles formed after adding the flocculant and to control as a function thereof the quantity of the added flocculant or the consumed mixing energy or the switching between dosing points being positioned either at the suction or the delivery side of the feed pump.

Since it is desirable to use flocculants most sparingly, all parameters influencing the formation of floc should be optimally applied. One of these parameters is the retention time being available for the formation and consolidation of floc particles after the flocculant has been added and before they are fed to the dewatering equipment. This retention time depends upon the sludge flow velocity and the length of path between dosing point and dewatering equipment. Within the predetermined retention time, the flocculant must be mixed and react with the sludge, form and consolidate the floc particles so they remain stable until they are fed to the dewatering equipment.

Up to now, when planning an installation, the position of the dosing point has essentially been determined on the basis of experiences obtained so far with each used flocculant in order to reach the desired retention time. The difficulty to be considered here consists in that the flow velocity of the sludge decreases strongly during one filtration charge resulting in an increasing retention time; i.e. the optimum conditions for the formation of floc particles established at the beginning of a filtration charge do not persist with a decreasing flow velocity and the flocculant is no longer used optimally.

On the other side, it has not been considered up to now that flocculants supplied by different manufacturers may need very different reaction and floc consolidation times. The optimum conditions of an installation may, therefore, not be suitable anymore if another flocculant is used.

This invention is aimed at presenting a procedure of the described manner as well as an installation allowing to perform this procedure which enables the parameters influencing the formation of floc particles to be adapted flexibly to changing operation conditions.

The solution to this task, in accordance with this invention, is described in claim 1 of this patent. The sub-claims refer to further advantageous refinements of the procedure according to the invention and to the installation which is necessary for its performance.

The advantage of this invention is that the length of path between the dosing point of the flocculant and the dewatering equipment is not rigidly determined but can be modified during operation. This allows to adapt the installation e.g. the different reactions of flocculants from different manufacturers and changing flow conditions during a filtration charge can be taken into account.

Figure 1:
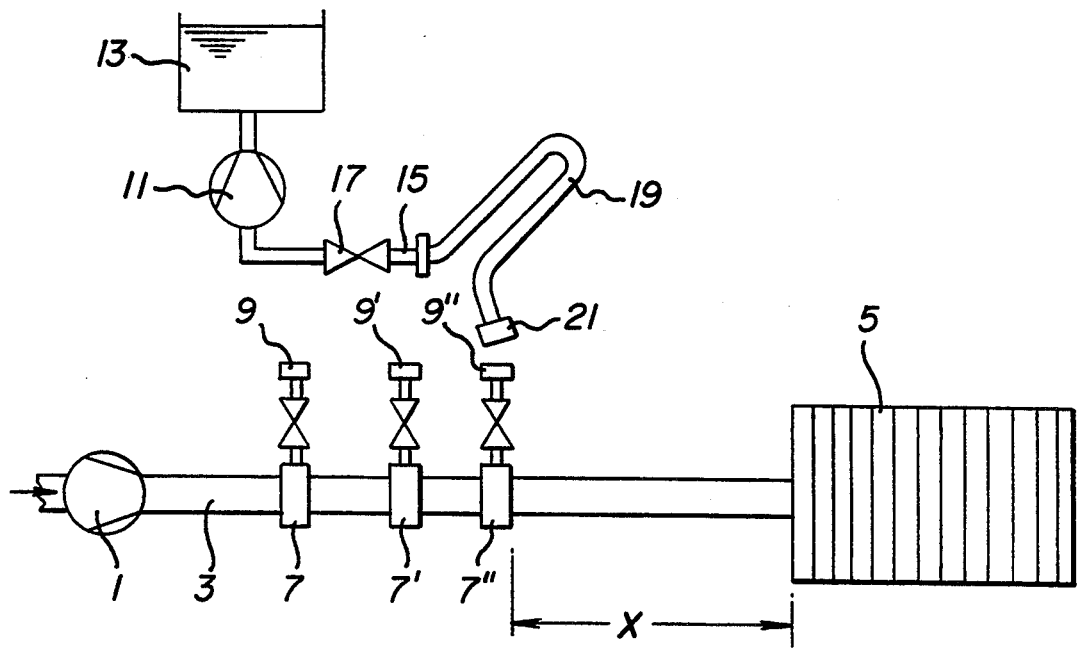
FIG. 1 a simplified scheme of an installation for conditioning and dewatering of sludge according to a first version of the invention.

Regarding the device described in FIG. 1, sludge is being fed by a feed pump (1) through a sludge pipe (3) to a dewatering equipment (5) which is represented in the drawing schematically as chamber filter press. The invention is, however, also suitable for other dewatering equipment, e.g. belt filter presses.

The sludge pipe (3) is provided at intervals with three dosing points (7, 7', 7''). Through a shutoff device, each dosing point is provided with a coupling piece (9, 9', 9''). A flocculant dosing pump (11) is, at the suction side, connected to a storage tank (13) for the flocculant solution. The feed line (15) with shutoff device (17) at the delivery side of the dosing pump (11) is connected to a flexible hose (19) which is provided at its end with a coupling piece (21) allowing to connect the hose (19) selectively to one of the coupling pieces (9, 9',9''). By this means, it is possible to select and supply one of the dosing devices (7, 7', 7'') with flocculant from the storage tank (13) which doesn't means anything else than to modify the distance 'x' from each dosing point in use to the dewatering equipment (5).

This simple version of the invention is advantageous, if e.g. successively flocculants of different manufacturers must be delivered by the dosing pump (4) from the storage tank (13) and where for each flocculant one of the dosing points (7, 7', 7'') has the optimal distance 'x' to the dewatering equipment (5).

Figure 2:
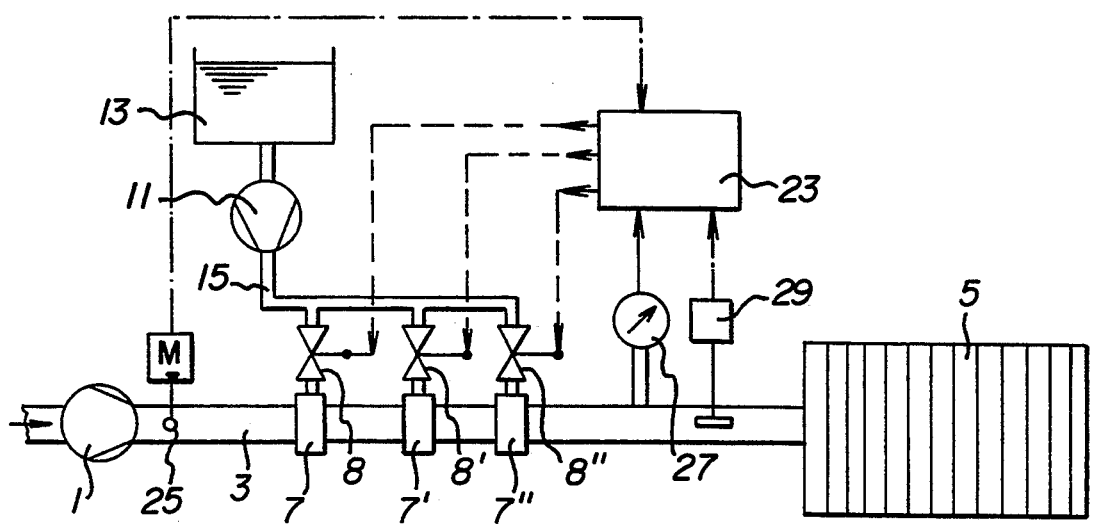
FIG. 2 the flow diagram of an installation according to a second version of the invention.

Regarding the version described in FIG. 2, each one of the dosing devices (7, 7', 7") positioned at intervals in the sludge pipe (3) is permanently connected, by means of a shutoff device each (8, 8', 8"), to the flocculant feed line (15) being supplied by the dosing pump (11). The shutoff devices (8, 8', 8") are opened or closed by a control system (23) emitting corresponding signals allowing to take selectively one or several dosing devices (7, 7', 7") in or out of operation. The control system (23) may be operated automatically as a function of different continuously measured operation parameters. First, it is possible at a measuring point located at the delivery side of the feed pump (1) to measure the flow velocity and the suspended solids content of the sludge which is being delivered by the feed pump (1) and to transmit a corresponding signal to the control system (23). It is also possible with a pressure meter (27) placed close to the dewatering equipment (5) to determine the pressure in the sludge pipe (3). Finally, by means of an optical sludge scanning equipment (29) also placed close to the dewatering equipment (5) inlet, it is possible to determine quantity, size and/or structure of the floc particles formed after the addition of the flocculant and corresponding signals can be sent to the control system (23). Adequate optical scanning equipment does exist. There are simple devices such as turbidity meters or more completed ones which optically analyse the structure of the sludge floc, which are known e.g. from DE-OS 37 43 428.

Figure 3:
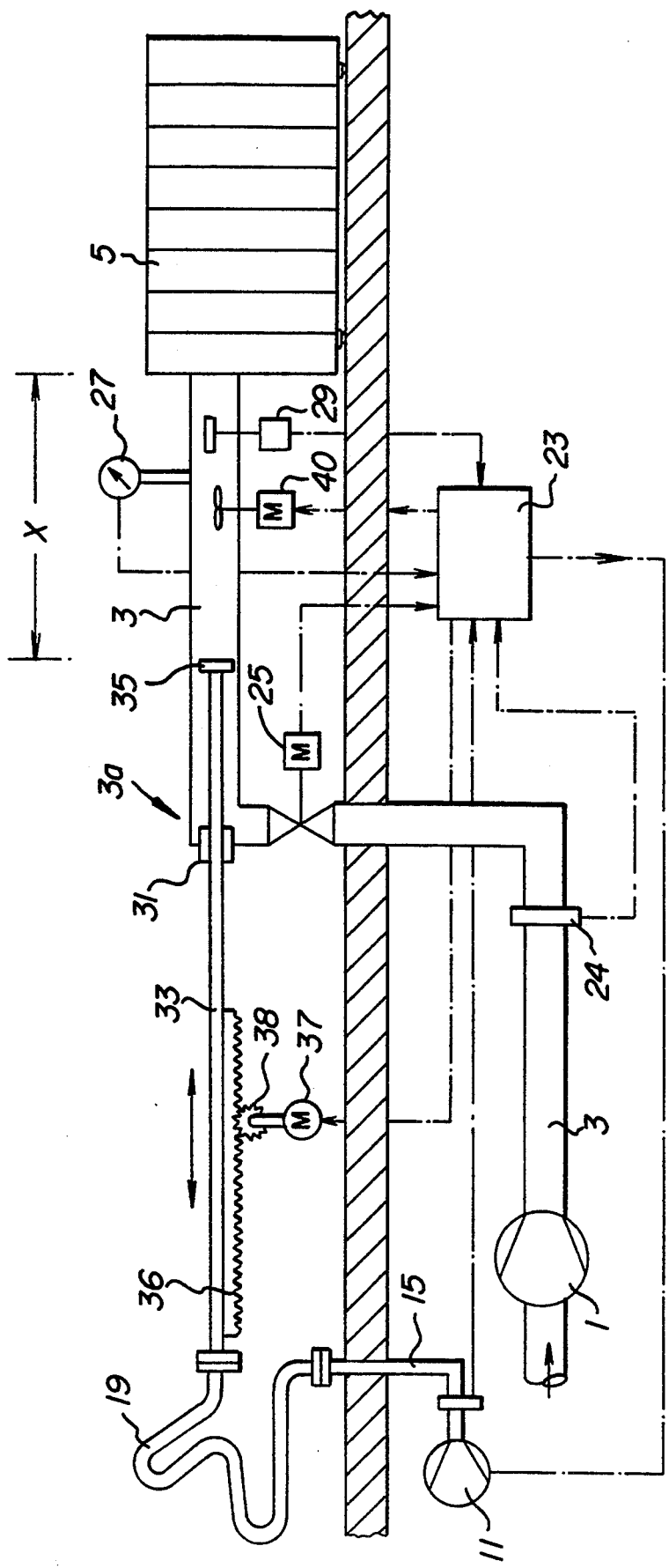
FIG. 3 the flow diagram of an installation according to a third version of the invention.

Regarding the version according to FIG. 3, the feed pump (1) delivers the sludge through an angular sludge pipe (3) to the dewatering equipment (5). At the pipe angle (3a) a removable lance (33) is introduced into a the sludge pipe (3) by means of a slide ring sealing. Through a flexible hose (19) the lance (33) is at its outer end connected to the flocculant feed line (15) which is supplied with flocculant solution by the dosing pump (11). The end of the lance (33) reaching into the sludge pipe (3) is provided with a dosing and distribution head (35) which preferably has a number of outlet openings for the flocculant solution at its outer circumference or distributed around the axis. The lance (33) can be displaced lengthwise by a servomotor (37), e.g. by means of a shifting pinion (38), which engages with the gears (36) provided on the lance (33). A drive with threaded spindle is also possible. By means of displacing the lance (33) with the servomotor (37), the distance 'x' of the dosing head (35) to the inlet of the dewatering equipment (5) is infinitely variable.

The lance (33) can be displaced automatically by the servomotor (37) by means of a control system (23) emitting signals to the servomotor (37) and eventually to the dosing pump (11) which delivers the flocculant. The control system (23) receives signals from different measuring instruments like meters (24, 25) used to determine the flow velocity and the suspended solids content of the sludge within the sludge pipe (3), a pressure meter (27) to determine the pressure in the sludge pipe (3), an optical scanning equipment (29) to determine size, quantity and structure of the formed sludge floc and a dosage meter (26) to measure the quantity of the added flocculant.

In order to actually achieve and optimum retention time, being necessary for the formation and consolidation of floc particles, by varying the distance covered by the sludge between dosing point and inlet of the dewatering equipment which according to this invention is possible, it is of importance to reach a most complete mixture of the flocculant with the sludge right at the dosing point. Otherwise, a not exactly determined length of path would not be available for the formation and consolidation of floc particles because of an incomplete mixture of flocculant with sludge. Therefore, the invention is aimed at using dosing devices at the flocculant dosing point in order to guarantee a most effective and complete mixture of the flocculant with the sludge. Different versions of such dosing devices are described in FIGS. 4 and 5.

Additionally a motorized stirrer (40) can be provided in the sludge pipe, i.e. exactly downstream of the displacement range of the lance (33) and in front of the optical scanning equipment (29) in order to intensify the mixture. The velocity of the stirrer and the subsequently introduced mixing energy can also be controlled by the control system (23).

Figure 4:
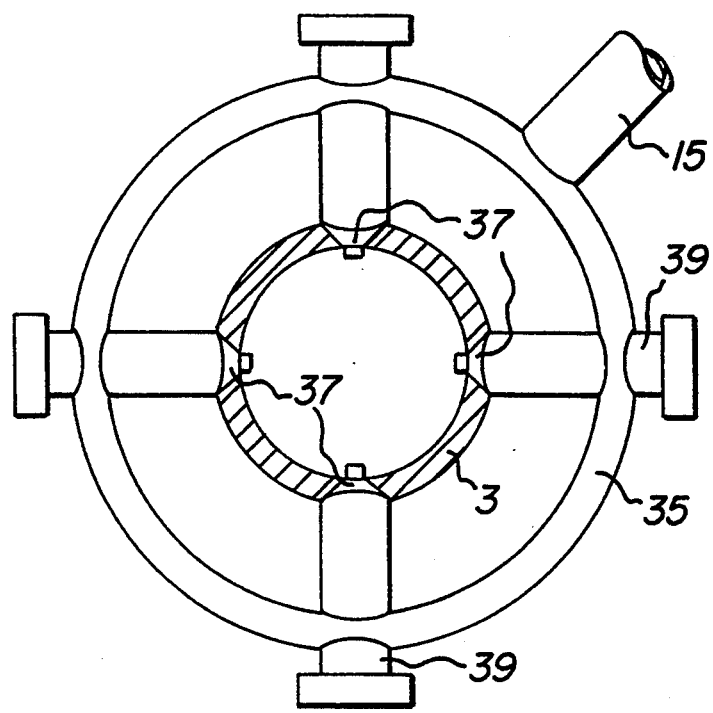
FIG. 4 a cross section of the sludge pipe being provided with a flocculant dosing device which can be used with the installation according to FIG. 1 or 2.

According to FIG. 4 the sludge pipe (3) is surrounded by a ring conduit (35) which is connected to the flocculant feed line (15). A number of e.g. four nozzles (37) being distributed at angular distances around the axis of the sludge pipe (3) are connected to the ring conduit (35). Each nozzle (37) can be provided at the outer circumference of the ring conduit (35) with a cleaning opening (39) which can be closed by a screwed-on cover or similar means.

Figure 5:
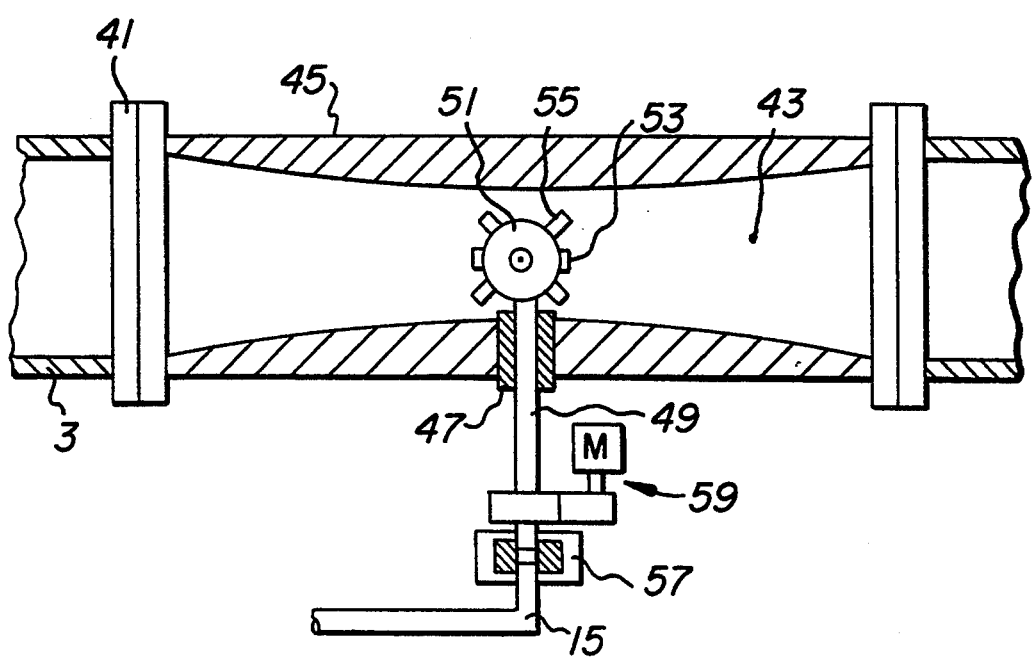
FIG. 5 a longitudinal section of the sludge pipe including another version of a dosing device which can also be used with the installation according to FIG. 1 or 2.

The sludge pipe (3) of the version according to FIG. 5 is provided with a pipe section (43) being inserted by means of screwed flanges (41) and whose inner wall surface presents a nozzle-type profile (45) to increase the flow velocity and to improve the mixing effectiveness. The profile, however, is not absolutely necessary, the pipe wall can also be smooth. In this pipe section (43) is pivoted by means of a sealed pivot bearing (47) a second pipe section (49) which, at its end, is equipped with a feeding head (51). This dosing head (51) is provided with several e.g. four outlet nozzles (53) being distributed around its axis. Furthermore, the dosing head (51) has protruding baffles or blades (55) in order to create turbulences in the sludge flow at the dosing point.

The pipe section (49) is connected to the flocculant feed line (15) by means of a sealed pivot bearing (57) and can be rotated around its own axis by a motor (59). In this way the dosing head (51) rotates around an axis being at right angle to the axis of the sludge pipe (3); this rotation of the nozzles (53) and baffles (55) leads to a very uniform and intensive mixture of the added flocculant with the sludge flow.

Alternatively the version according to FIG. 5, the dosing head (51) can also be positioned in a way that its axis of rotation is either situated in parallel or its inclined at an angle toward the axis of the sludge pipe (3).

Each one of the different dosing devices (7, 7', 7") of the installation according to FIG. 1 or 2 can be shaped according to the version of FIGS. 4 or 5.

Regarding the version according to FIG. 3, it also possible to shape the dosing head (35), being provided at the end of the lance (33), in order to rotate it or the entire lance (33) around the longitudinal axis which allows to produce similar effects as in case of the dosing head according to FIG. 5.

I claim:

1. An installation for conditioning and dewatering of sludge wherein flocculent may be introduced at one or more positions along a pipe carrying the sludge, said positions being modifiable during dewatering, said installation comprising:

dewatering equipment;
a feed pump;
a sludge pipe connecting a discharge of said feed pump to an inlet of said dewatering equipment; and
means for dosing the sludge with a flocculent in at least two dosing positions along said sludge pipe at different distances from said dewatering equipment, said dosing means operable to add the flocculent to sludge in said sludge pipe at different locations in said sludge pipe, whereby a distance traveled by a mixture of sludge and flocculent in the sludge pipe before reaching the inlet of said dewatering equipment is varied to achieve an optimum retention time necessary for formation and consolidation of sludge floc particles.

2. An installation according to claim 1, further comprising shut off devices fixedly connecting said dosing means to a flocculent feed line, each of said shut off devices being individually openable and closeable for selectively adding flocculent to sludge in said sludge pipe in at least one of said dosing position.

3. An installation according to claim 1, further comprising coupling pieces attached to said dosing means, each of said coupling pieces being connectable to a flocculent feed line for selectively adding flocculent to sludge in said sludge pipe in one of said dosing positions.

4. An installation according to claim 1, wherein said dosing means comprises at least two dosing devices coupled to different flocculent feed lines for adding different flocculents to sludge in said sludge pipe.

5. An installation according to claim 1, wherein said dosing means comprises a distribution head protruding into said sludge pipe and having outlet nozzles positioned around a circumference of the head for adding flocculent to sludge in said sludge pipe.

6. An installation according to claim 5, wherein said distribution head is rotatable in said sludge pipe about an axis perpendicular to the longitudinal axis of said sludge pipe to improve mixing effectiveness in said sludge pipe.

7. An installation according to claim 5, wherein said dosing means further comprises baffles or blades positioned around the circumference of the head for creating turbulence in sludge flowing in the sludge pipe at a dosing point.

8. An installation according to claim 1, further comprising a pipe section inserted in said sludge pipe, an inner wall surface of said pipe section having a venturi-shaped profile to increase flow velocity and improve mixing effectiveness in said sludge pipe.

9. An installation for conditioning and dewatering of sludge wherein flocculent may be introduced at one or more positions along a pipe carrying the sludge, said positions being modifiable during dewatering, said installation comprising:
dewatering equipment;
a feed pump;
a sludge pipe connecting a discharge of said feed pump to an inlet of said dewatering equipment; and
a dosing device movable along a longitudinal axis of said sludge pipe to vary the distance between said dosing device and said dewatering equipment for adding flocculent to sludge in said sludge pipe at different locations in said sludge pipe, whereby a distance traveled at a mixture of sludge and flocculent in the sludge pipe before reaching the inlet of said dewatering equipment is varied to achieve an optimum retention time necessary for formation and consolidation of sludge floc particles.

10. An installation according to claim 9, wherein said dosing device comprises a lance having a distribution head at a first end thereof, said first end being positioned in said sludge pipe, said distribution head having outlet openings for adding flocculent to sludge in said sludge pipe.

11. An installation according to claim 10, wherein said dosing device is rotatable in said sludge pipe about the longitudinal axis of said sludge pipe to improve mixing effectiveness in said sludge pipe.

12. An installation according to claim 10, wherein said first end is movable along the longitudinal axis of said sludge pipe by means of a shifting pinion which engages with gears positioned on a second opposing end of said lance.

13. An installation according to claim 9, further comprising a motorized stirrer positioned in said sludge pipe downstream of said dosing device to improve mixing effectiveness in said sludge pipe.

14. An installation according to claim 9, wherein said dosing device comprises a ring conduit surrounding an exterior of said sludge pipe, said conduit having nozzles positioned around a circumference of the sludge pipe, said nozzles being inserted into said sludge pipe during addition of flocculent.

* * * * *